US005095318A

United States Patent [19]

Sugiyama

[11] Patent Number: 5,095,318

[45] Date of Patent: Mar. 10, 1992

[54] THERMAL HEAD WITH DOT SIZE CONTROL MEANS

[75] Inventor: Hayami Sugiyama, Mie, Japan

[73] Assignee: Shinko Electric Co., Ltd., Tokyo, Japan

[21] Appl. No.: 617,611

[22] Filed: Nov. 26, 1990

Related U.S. Application Data

[63] Continuation-in-part of Ser. No. 326,625, Mar. 21, 1989, Pat. No. 5,021,806.

[51] Int. Cl.[5] .................... G01D 15/10; G01D 15/16; B41J 2/335

[52] U.S. Cl. .................................... 346/76 PH

[58] Field of Search .......................... 346/76 PH

[56] References Cited

FOREIGN PATENT DOCUMENTS 0227656 10/1987 Japan .......................... 346/76 PH

*Primary Examiner*—Benjamin R. Fuller
*Assistant Examiner*—Huan Tran
*Attorney, Agent, or Firm*—Kane, Dalsimer, Sullivan, Kurucz Levy, Eisele and Richard

[57] ABSTRACT

A thermal head for use in thermal printing including: a substrate having an upper face; an electrically insulating layer, coated over the upper face of the substrate; heating means, coated over the insulating layer, for providing heat for printing a dot of a picture; a protection layer, coated over the heating means; and dot area control means, formed above the heating means to receive sufficient heat for the printing, for transferring the heat from the heating means upwards for the printing of the dot and for controlling an area of the dot.

7 Claims, 2 Drawing Sheets

THERMAL HEAD WITH DOT SIZE CONTROL MEANS

This is a continuation-in-part of Ser. No. 7/326,625 filed Mar. 21, 1989, now U.S. Pat. No. 5,021,806.

BACKGROUND OF THE INVENTION

The present invention relates to a thermal head which is suitably used for a thermal printer.

A typical example of a portion of the thermal head according to the prior art is illustrated in FIGS. 1 and 2, in which an aluminum oxide substrate 1 has a glass glaze layer 2 coated over its upper face. Coated over the upper face of the glass glaze layer 2 is a resistance heating element 3, over which are formed electrodes 4*a*, 4*b* at a predetermined distance, thus a portion of the heating element 3, which is located below the gap between the electrodes 4*a*, 4*b* serving as a heating portion 3*a*. One of the electrodes 4*a*, 4*b* is grounded and the other is connected to an output terminal of a power supply control unit (not shown), which supply electric current to the heating portion 3*a*. The reference numeral 5 indicates an oxidation-resistant film to cover both the electrodes 4*a*, 4*b* and the heating portion 3*a*. The oxidation-resistant film 5 is coated with a wear- or abrasion resistant film 6. The oxidation-resistant film 5 and the abrasion-resistant film 6 constitute a protection film. FIG. 2 illustrates a plan view of the heating portion 3*a* when the protection layer is removed. When current is supplied to each of heating portions 3*a* of the thermal head, it is uniformly heated, so that the shape of a dot of a picture is reproduced as shown by the broken line in FIG. 2, for example, in a thermal paper.

In the thermal printer, it is preferable to change the size of dots, reproduced on a printing paper, for expressing a picture in gradation. However, the thermal head above described cannot make such dot printing, and the printing thereof is restricted by the shape of each heating portion 3*a*.

Accordingly, it is an object of the present invention to provide a thermal head which is capable of changing the size of dots of a picture in printing.

SUMMARY OF THE INVENTION

With this and other objects in view, the present invention provides a thermal head for use in thermal printing including: a substrate having an upper face; an electrically insulating layer, coated over the upper face of the substrate; heating means, coated over the insulating layer, for providing heat for printing a dot of a picture; a protection layer, coated over the heating means; and dot area control means, formed above the heating means to receive sufficient heat for the printing, for transferring the heat from the heating means upwards for the printing of the dot and for controlling an area of the dot.

BRIEF DESCRIPTION OF THE DRAWINGS

In the drawings, in which like reference characters designate corresponding parts throughout several views and descriptions thereof are omitted after once given.

DETAILED DESCRIPTION OF THE PREFERRED EMBODIMENT

Figure 1:
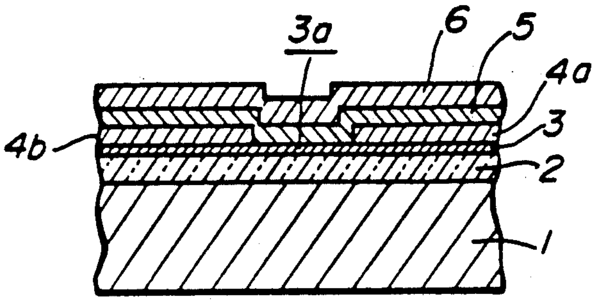
FIG.1 (PRIOR ART)
FIG. 1 is an enlarged partial vertical cross-section of the thermal head according to the prior art.
Figure 2:
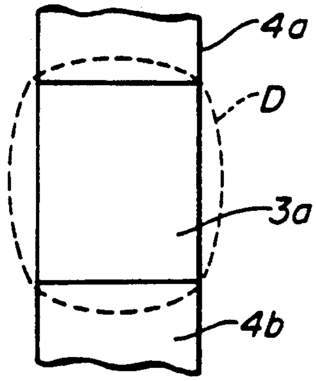
FIG.2 (PRIOR ART)
FIG. 2 is an enlarged plan view of the thermal head in FIG. 1, some components thereof being removed for illustrating the heating portion.
Figure 3:
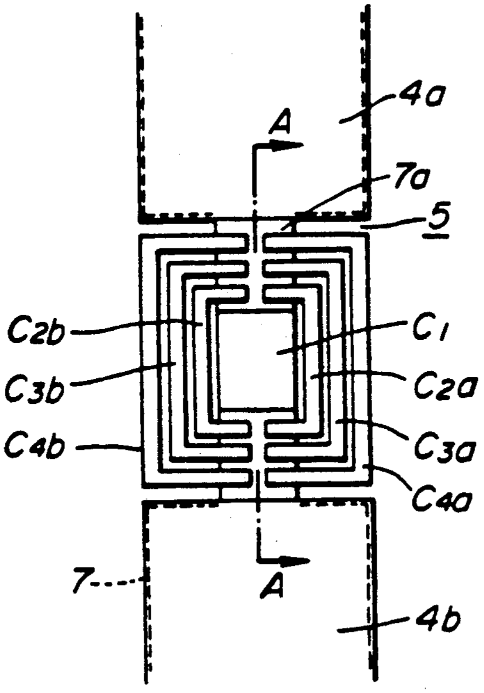
FIG. 3 is an enlarged partial plan view of a thermal head of the present invention, some components thereof being taken away for showing a heating portion thereof.
Figure 4:
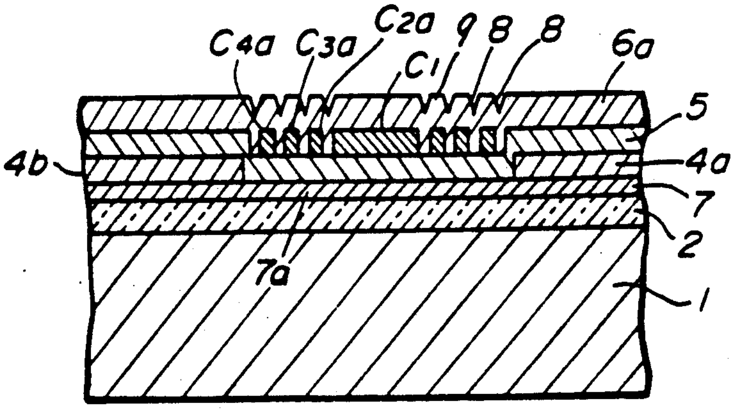
FIG. 4 is a vertical cross-section of the thermal head taken along the line A—A in FIG. 3, no part of the thermal head being removed.

Referring now to FIGS. 3 and 4, the reference numeral 7 designates a resistance heating element layer of a conventional material, coated over a glass glaze layer 2. The resistance heating element layer 7 has electrodes 4*a* and 4*b* coated over it at predetermined interval A bridge like portion 7*a*, which is located just below the gap between the electrodes 4*a* and 4*b*, constitutes a heating portion. The heating portion 7*a* is smaller in width than the other portion of the resistance heating element 7. The heating portion 7*a* and the electrodes 4*a*, 4*b* are coated with an oxidation resistance film 5, made of a conventional material such as $SiO_2$, on which thermal transfer aluminum members C1, C2*a*, C3*a*, C4*a*, C2*b*, C3*b*, C4*b* are formed at the same level with equal thickness, about 1–2 μm in this embodiment. The thermal transfer member C1 has a rectangular shape, equal in width, to the heating portion 7*a* and is located just above the center of the heating portion 7*a*. A pair of thermal transfer members C2*a* and C2*b* have a channel-shape or generally C-shape in plan view. The thermal transfer members C3*a*, C3*b*, C4*a* and C4*b* have configurations similar to the thermal transfer members C2*a* and C2*b*. The thermal transfer members C2*a* and C2*b* are the smallest among the thermal transfer members C2*a*–C4*a*, C2*b*–C4*b* and are symmetrically arranged about the center line of the thermal transfer member C1 or the A—A line in an equi-spaced manner from the thermal transfer member C1 so that they surround the latter. The thermal transfer members C4*a* and C4*b* are the largest of the thermal transfer members. The thermal transfer member pair C3*a*, C3*b* is symmetrically arranged with equal spacing from respective thermal transfer members C2*a* and C2*b* in the same manner as the latter so that they surround the thermal transfer members C2*a* and C2*b*. Also, the thermal transfer members C4*a* and C4*b* are symmetrically disposed with an equal interval from respective thermal transfer members C3*a* and C3*b* so that they the latter. The reference numeral 6*a* indicates a conventional abrasion resistant film made of a conventional material such as $Ti_2O_5$, and coated over both the thermal transfer members C1, C2*a*–C4*a*, C2*b*–C4*b* and the oxidation resistance film 5. The upper surface of the abrasion resistance film 6*a* has V-shaped grooves 8 formed in it so that bottoms of the grooves 8 pass just above the center of the space of adjacent two thermal transfer members. Thus, projections 9, which have shapes similar to corresponding thermal transfer members, are defined by grooves 8.

In the embodiment shown in FIG. 3, the innermost heat transfer member $C_1$ is surrounded by the outer heat transfer members $C_{2a}$, $C_{3a}$, $C_{4a}$, $C_{2b}$, $C_{3b}$, $C_{4b}$. Heat transfer members $C_{2A}$, $C_{3A}$, $C_{4A}$, $C_{2B}$, $C_{3B}$, $C_{4B}$ are arranged so that a portion of the total cross-sectional area of each of these transfer members is above the heating means. The portion of the cross-sectional area of the heat transfer members $C_{2A}$, $C_{3A}$, $C_{4A}$, $C_{2B}$, $C_{3B}$, $C_{4B}$ above the heating means to the total cross-sectional area of the heat transfer members $C_{2A}$, $C_{3A}$, $C_{4A}$, $C_{2B}$, $C_{3B}$, $C_{4B}$ defines a ratio which varies among the heat transfer members. This ratio decreases from the innermost heat transfer member to the outermost heat transfer member (e.g.: $C_{2A}$ and $C_{4A}$).

For a thermal head for 200 dpi printing, the width of the thermal transfer members C2a–C4a, C2b–C4b may be about 5 μm, and the gap between two thermal transfer members may be about 3 μm.

When supplied with current, the heating portion 7*a* of the thermal head is uniformly heated to elevate temperatures of the thermal transfer members C1, C2*a*–C4*a* and C2*b*–C4*b*. The temperatures of these thermal transfer members depend on both the distance from the heating portion 7*a* and the area thereof. Thus, the innermost thermal transfer member C1 becomes the hottest, and the thermal transfer members drop in temperature from the innermost thermal transfer member C1 toward the outermost thermal transfer members C4*a* and C4*b*. Control of both current supply time and magnitude of current makes it possible to heat the thermal transfer member C1 or both the thermal member C1 and other specific thermal transfer members to temperatures sufficient for melting an ink of a ribbon in a thermal transfer printer or to temperatures necessary to turn a portion of a thermal paper to be a black dot. The size of each dot reproduced in a printing paper is, thus, controlled and hence gradation of the picture tone is achieved by changing the size of dots.

In place of the channel-shaped thermal transfer members C2*a*, C2*b*, C3*a*, C3*b*, C4*a* and C4*b*, each pair of the transfer members may be formed integrally into an annular shape.

The thermal transfer members C1, C2*a*–C4*a* and C2*b*–C4*b* may be made of other materials, have good thermal conductivity, such as copper, gold and silver.

The thermal transfer members C1, C2*a*–C4*a* and C2*b*–C4*b* may be arranged outside the protection film, for example, on the upper surface of the abrasion resistant film 6*a*.

What is claimed is:

1. A thermal head for use in thermal printing, comprising:
   (a) a substrate having an upper face;
   (b) an electrically insulating layer, coated over the upper face of the substrate;
   (c) heating means, coated over the insulating layer, for providing heat for printing a dot of a picture;
   (d) a protection layer, coated over the heating means; and
   (e) dot area control means, formed above the heating means to receive sufficient heat for printing, for transferring heat from the heating means upwards for printing of a dot and for controlling an area of a dot, said dot area control means being further comprised of a plurality of heat transfer member, comprising an innermost heat transfer member and an outermost heat transfer member said outermost heat transfer member having a surface area and being arranged so that only a portion of said surface area of said outermost heat transfer member is above the heating means.

2. The thermal head as set forth in claim 1, wherein said portion of the surface area of said outermost heat transfer member above the heating means and said surface area of the outermost heat transfer 3. A thermal head as recited in claim 1, wherein the heat transfer members are made of a material having a good heat conductivity.

4. A thermal head as recited in claim 3, wherein said innermost heat transfer member is a plate located just above the heating means; and wherein said outermost heat transfer member has elongated curved shape.

5. A thermal head as recited in claim 1, wherein the heat transfer members are formed within the protection layer.

6. A thermal head as recited in claim 5, wherein the protection layer comprises an oxidation resistant layer, coated over the heating means for protecting the heating means from being oxidized, and an abrasion resistant layer coated over the oxidation resistant layer, the oxidation resistant layer having an upper face, and wherein the heat transfer members are formed in the abrasion resistance layer and on the oxidation resistant layer.

7. A thermal head for use in thermal printing, comprising:
   (a) a substrate having an upper face;
   (b) an electrically insulating layer, coated over the upper face of the substrate;
   (c) heating means, coated over the insulating layer, for providing heat for printing a dot of a picture;
   (d) a protection layer, coated over the heating means;
   (e) dot area control means, formed above the heating means to receive sufficient heat for printing, for transferring heat from the heating means upwards for printing of a dot and for controlling an area of a dot; and
   (f) wherein the dot area control means comprises a plurality of heat transfer members, each having a surface area, including an innermost heat transfer member and an outermost heat transfer member, said heat transfer members being arranged coaxially at an equal level above the heating means so that the innermost heat transfer member is surrounded by the outermost heat transfer member, said outermost heat transfer member being further arranged so that only a portion of said surface area of said outermost heat transfer member is above the heat means.

* * * * *